United States Patent

[11] 3,599,333

[72] Inventor Joseph C. Muhler
       Indianapolis, Ind.
[21] Appl. No. 32,992
[22] Filed Apr. 29, 1970
[45] Patented Aug. 17, 1971
[73] Assignee Indiana University Foundation
       Bloomington, Ind.
       Continuation-in-part of application Ser. No.
       833,644, June 16, 1969, now abandoned.

[54] DENTAL PROPHYLAXIS IMPLEMENT
    15 Claims, 9 Drawing Figs.
[52] U.S. Cl. .................................................. 32/59
[51] Int. Cl. ............................................... A61c 3/06
[50] Field of Search .......................................... 32/58, 59

[56] References Cited
UNITED STATES PATENTS
3,241,239  3/1966  Ellis ............................. 32/58

Primary Examiner—Robert Peshock
Attorneys—Ronald L. Engel, Daniel W. Vittum, Jr. and Gomer W. Walters ABSTRACT: An improved dental prophylaxis implement comprises a prophylaxis cup formed of resilient material and having a cavity into which a charge of dental prophylaxis paste or the like may be placed, with up to about 15 percent by weight of an anticariogenic agent being incorporated in the resilient material of the prophylaxis cup. Additionally, or alternatively, the cup may comprise up to about 50 percent by weight of a dental cleaning and polishing agent.

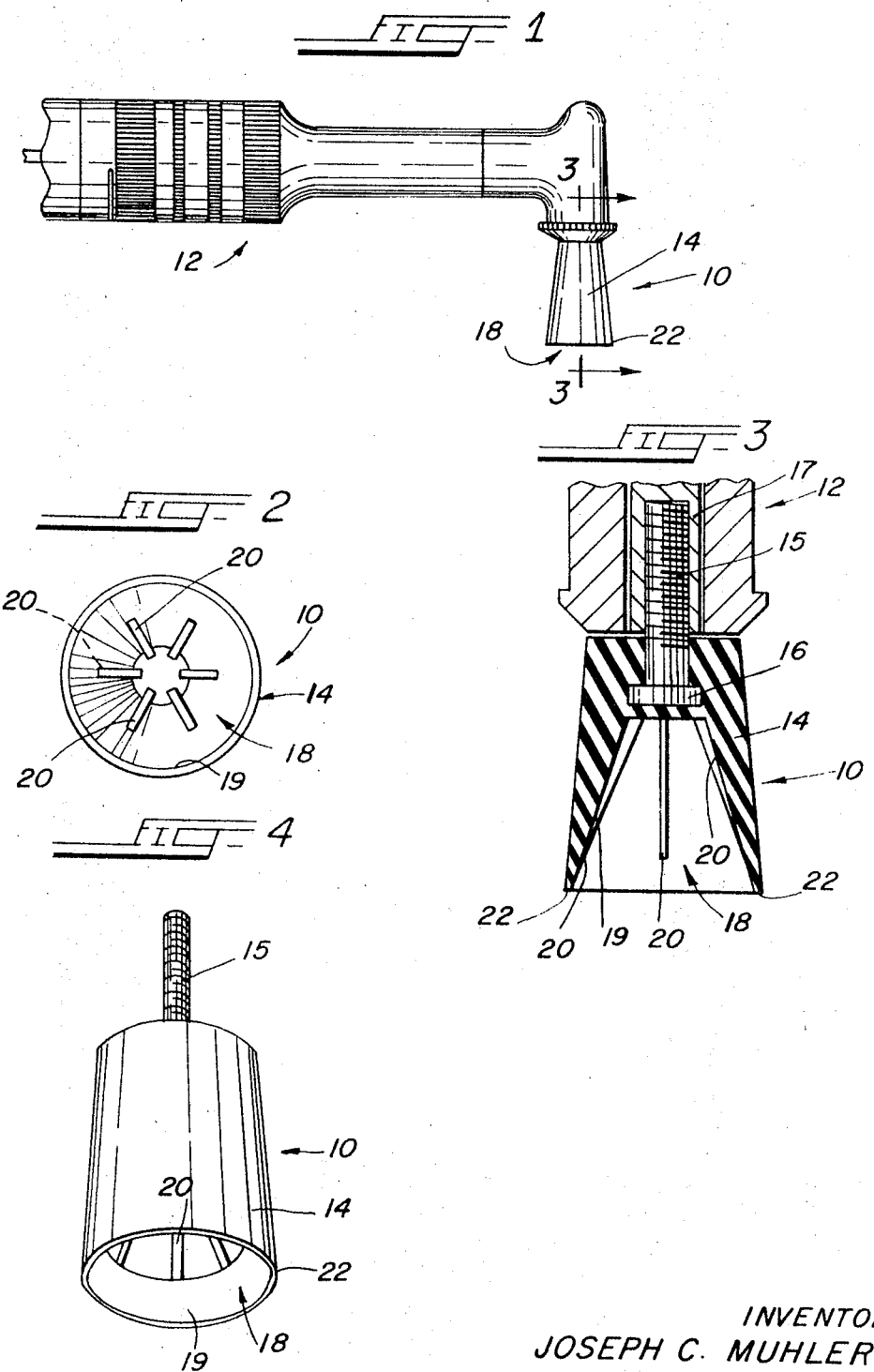

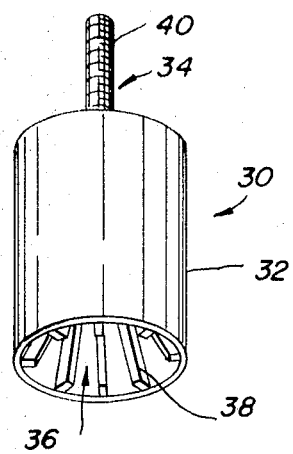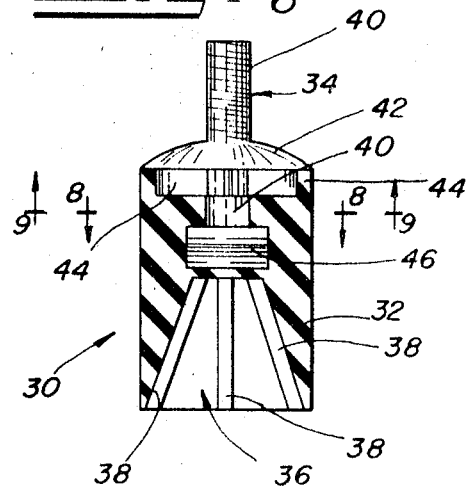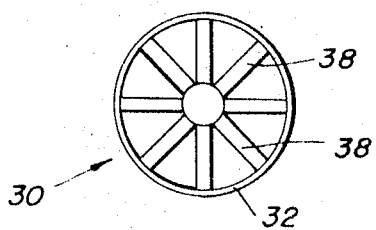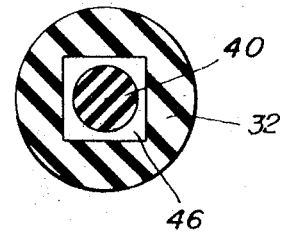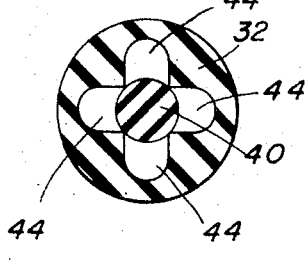

DENTAL PROPHYLAXIS IMPLEMENT

CROSS-REFERENCE

This application is a continuation-in-part of applicant's copending U.S. application entitled "DENTAL PROPHYLAXIS IMPLEMENT," Ser. No. 833,644, filed June 16, 1969 now abandoned.

BACKGROUND OF THE INVENTION

1. Field of the Invention

This invention relates to the dental prophylaxis arts and more particularly to a dental prophylaxis cup incorporation an anticariogenic agent and/or a dental cleaning and polishing agent, especially a dental cleaning and polishing agent comprising zirconium silicate.

2. Description of the Prior Art

Dental plaque and pellicle, food particles, exogenous stains, and other tooth surface pigmentation can be removed, to varying degrees, from teeth by means of a suitable dentifrice and toothbrush, as in ordinary daily brushing. Some enamel stains and pigmentations, however, are much too resistant to the abrasives found in conventional dentifrice formulations to be effectively removed. As a result, dentists must perform a "prophylaxis" in order to remove not only dental calculus (tartar) but the accumulated stains not satisfactorily removed by the daily use of a dentifrice. Most frequently, when either a dentifrice or the common abrasive used to perform a prophylaxis are employed, the teeth may be cleaned, but they exhibit a low luster or polish. For good dental esthetics, clean teeth with a high luster are desired, and the use of a prophylaxis implement incorporating a dental abrasive in a prophylactic treatment as described herein accomplishes these results in a manner superior to any agent heretofore evaluated.

The problems encountered in the relatively infrequent use of an abrasive in a prophylactic paste, for example, a prophylaxis performed once or twice a year, are much different than the problems encountered in the use of an abrasive as a constituent of a dentifrice for use two or three times a day, even though the desired end result of cleaning and polishing of enamel may be the same. Obviously, it is possible to use a more highly abrasive agent in a prophylactic paste than in a daily brushing with a conventional dentifrice. However, care must be taken in both cases to avoid excessive hard tooth structure loss or scratching of the enamel at the expense of cleaning action. In general, it has been assumed that in attempting to remove the more difficult forms of stain (e.g., tobacco, green, stannous fluoride, silver nitrate, etc.) there must be a major compromise between cleaning and tooth structure loss, or, in other words, that, in order to have maximum removal of these more difficult stains and/or pigmentations, tooth structure must be sacrificed.

It has likewise been found that the use of a particular particle size distribution of zirconium silicate with a specific surface configuration in a prophylaxis implement as described herein effectively removes even the most difficult enamel stains and pigmentations while minimizing hard tooth structure loss due to abrasion.

Another factor which should be considered in the development of a suitable prophylaxis implement is the ability to polish the teeth to a high luster, that is, to achieve smooth and highly lustrous enamel surfaces. Highly polished surfaces apparently are less receptive to retention of plaque and oral debris, and this factor is one of the motivating reasons for developing an implement which not only cleans effectively but which produces an exceptionally good luster. However, up to this time good luster could not be achieved without sacrificing cleaning or increasing abrasiveness.

Likewise, the dental prophylaxis arts have also utilized the beneficial aspects of stannous and fluoride ion containing preparations in carrying out professional dental prophylaxis treatments. Thus, specially formulated prophylaxis pastes comprising fluoride-containing anticariogenic agents, especially those further comprising stannous ion containing adjuvants (e.g., stannous fluoride, $SnF_2$, stannous fluorozirconate, $SnZrF_6$, and the like) have been employed satisfactorily as prophylaxis mixtures, as set forth and described in applicant's U.S. Pat. No. 3,257,282. However, all of the foregoing dental prophylaxis paste or powder compositions have heretofore been utilized in the oral cavity through the use of an inert applicator, usually called a prophy cup, and which is mounted on a suitable prophy angle attached to a dental power unit. Such a prophy cup has generally taken the form of a cylindrical body having an open bottomed cavity therein into which project a plurality of radial fins. When rotated at high speed, the cavity and fins serve to apply the prophylaxis paste or powder material to the teeth. However, prophy cups heretofore utilized have merely served as inert bodies which merely facilitated the application and treatment of the teeth with the prophylaxis paste comprising a prophylaxis abrasive and, in many cases, a fluoride-containing anticariogenic agent.

Thus, a primary object of the present invention is to provide an improved dental prophylaxis cup designed to function independently in carrying out a suitable dental prophylaxis.

A related object is to provide a dental prophylaxis cup of the character described which may be employed either with conventional abrasive containing prophylaxis paste or with nonabrasive containing prophylaxis compositions to clean and polish the teeth.

Another object is to provide a dental prophylaxis cup which, when employed in accordance with this invention, provides an independent source of fluoride and/or stannous ions to be incorporated into the tooth enamel in order to make it more resistant to dental caries.

A still further object is to provide a dental prophylaxis cup which, when employed in accordance with the subject invention, not only cleans the teeth, but imparts a high degree of polish thereto, thereby reducing the susceptibility of the teeth to the accumulation and reaccumulation of dental plaque, pellicle, and dental calculus (tartar).

SUMMARY OF THE INVENTION

In accordance with the present invention, the foregoing objects, advantages, and features are achieved. More particularly, the present invention involves a dental prophylaxis cup comprising a generally cylindrical, unitary body provided with mounting means at its upper end for attachment to a conventional dental handpiece (e.g., prophy angle or the like). The bottom end of the unitary body is hollowed so as to provide a cavity into which a charge of dental prophylaxis paste or the like may be placed. Preferably, auxiliary applicator means, such as a plurality of generally flat, radial fins, are provided in association with the cavity.

A prime feature of this invention involves the incorporation in the resilient material from which the unitary body is formed of up to about 15 percent by weight of an anticariogenic agent such as an agent containing fluoride and/or stannous ions. An improved dental cup of this type not only permits greater amounts of fluoride and stannous ions to be incorporated into the dental enamel, but also appears to enhance the stability of the resulting enamel crystal lattice.

Another feature of the present invention involves the additional or alternative incorporation in the resilient material from which the unitary body is formed of up to about 50 percent by weight of a dental cleaning and polishing agent, especially a dental cleaning and polishing agent comprising zirconium silicate. In addition to providing the therapeutic fluoride benefits noted above, an improved dental prophylaxis cup so constituted is able in its own right to clean the teeth and to impart a high degree of polish to tooth surfaces without unduly abrading the tooth surface. Likewise, when used with conventional dental prophylaxis pastes, such a prophy cup additionally enhances their cleaning and polishing capabilities. Advantageously, the cup will comprise both fluoride and cleaning and polishing agent.

DESCRIPTION OF THE DRAWINGS

The foregoing and other objects, advantages, and features of the present invention will hereinafter appear, and, for purposes of illustration, but not of limitation, an exemplary embodiment of the present invention is shown in the accompanying drawings in which:

FIG. 1 is a side elevational view of an improved prophylaxis cup mounted on a conventional dental prophy angle;

FIG. 2 is a bottom plan view of such a prophy cup;

FIG. 3 is a sectional view taken substantially along line 3-3 in FIG. 1;

FIG. 4 is a perspective view of such a prophy cup;

FIG. 5 is a perspective view of another prophy cup produced in accordance with the present invention;

FIG. 6 is a side elevational view thereof, with the prophy cup body being shown in section;

FIG. 7 is a bottom plan view thereof;

FIG. 8 is a sectional view taken substantially along line 8-8 of FIG. 6; and

FIG. 9 is a sectional view taken substantially along line 9-9 of FIG. 6.

DETAILED DESCRIPTION OF THE PREFERRED EMBODIMENTS

A dental prophylaxis cup 10 produced in accordance with the present invention is illustrated in the drawings. Prophy cup 10 is mounted on a conventional prophy angle 12 (see FIG. 1) which in turn is suitably connected to a dental unit (not shown). Through appropriate gears and linkages (not shown), prophy cup 10 may be selectively rotatably driven (usually under the control of a foot treadle operated by the dentist or dental hygienist) for a purpose that will hereinafter appear.

As best shown in FIGS. 2-4, prophy cup 10 comprises a generally cylindrical body 14 which may advantageously take the form of a truncated cone. Body 14 may also take the form of a true cylinder or indeed substantially any other generally cylindrical configuration which provides a paste holding cavity and which may be rotated and applied to the teeth to accomplish a dental prophylaxis. However, the tapered configuration pictured in FIGS. 1-4 represents the preferred form of prophy cup in accordance with the present invention.

Prophy cup 10 includes suitable attaching means, such as a screw 15 suitably affixed and embedded in the cup 10 by means of a head 16 (see FIG. 3) surrounded by the material from which the cup is formed. Screw 15 mates with a complementary threaded sleeve 17 provided in prophy angle 12.

A cavity 18 is formed in the lower portion of prophy cup 10, and the sidewalls 19 thereof preferably taper in the thickness from their lower edge to the top edge, as shown in FIG. 3. The tapered sides of cavity 18 facilitate the application of prophylaxis paste by the cup as will hereinafter appear.

A plurality of radial fins 20 are molded integrally with the sidewalls 19 of cavity 18, and these fins serve as auxiliary applicator means as will hereinafter appear. The taper and thickness of the sidewalls 19 is such that when downward force is exerted on the cup (as in applying it to a tooth surface), the rim portion 22 thereof does not roll under, but rather rolls outwardly so that the interior, rather than the exterior, of the cup contacts the tooth surface. The unitary body of prophy cup 10 may be made from any number of suitable resilient materials. Natural and synthetic rubbers may advantageously be employed, or plastics such as polyamides (e.g., nylon), flexible polystyrene, polyethylene, polypropylene, and the like may be used. The plastic should be chosen, however, so that the finished body has suitable resilience and flexibility and yet exhibits proper wear characteristics under clinical use. Butadiene-styrene block copolymers, available from Shell Chemical Company under the trademark "Thermolastic," are especially preferred materials for formulating the prophy cup by reason of their wear characteristics and the ease with which they may be handled in conventional molding equipment.

An alternative configuration of a prophy cup in accordance with the present invention is illustrated in FIGS. 5-9. These drawings show a prophy cup taking the form of a unitary body 30 having a cylindrical sidewall structure 32. As best shown in FIG. 6, sidewall 32 is tapered in cross section.

An attaching screw 34, which may be formed of plastic, metal, or the like, is embedded in the upper end of the body 30, and the lower end thereof is hollowed out to form a cavity 36 into which dental prophylaxis paste or the like may be incorporated. A plurality of radial fins 38, which serve as auxiliary applicator means, are integrally molded within cavity 36 as best shown in FIG. 6.

Screw 34 has a shaft 40, the upper end of which is adapted to be threadably received in the working end of the prophy handpiece. Screw 34 preferably has formed integrally therewith an annular end piece 42 which covers the upper end of the unitary body 30. Projecting from the shaft of screw 34 are four projecting ears 44 (see FIGS. 6 and 9) which are embedded in the resilient material from which the unitary body 30 is formed. Similarly, at the lower end of shaft 40 is formed a block 46 which likewise is embedded in body 30. Ears 44 and member 46 thus provide for a positive interlock between the screw 34 and the body 30 so that they will rotate as a single unit without slippage.

Production of suitable prophy cups in accordance with the present invention may advantageously be carried out by a die cutting operation when natural or synthetic rubber material is employed. Preferably, however, an injection molding procedure is utilized with the preferred plastic material (i.e., butadienestyrene block copolymer). A suitable manufacturing procedure involves proper placement of a screw (such as screw 15 shown in FIGS. 3 and 4 or screw 34 shown in FIGS. 5 and 6) in the neck of a suitable mold of a suitable plastic material into which previously has been incorporated the desired amount of the selected abrasive material. By utilizing such a procedure, with a multicavity mold and automated equipment for placement of the screws in the cavity, large numbers of uniformly configured cups may be economically manufactured.

As previously noted, a special feature of the prophy cup of the present invention is that up to about 15 percent by weight of an anticariogenic agent may be incorporated throughout the unitary body of the prophy cup. Advantageously, up to about 50 percent by weight of a dental cleaning and polishing agent may also provided in the unitary body of the prophy cup. The cleaning and polishing agent and the anticariogenic agent (hereinafter called the "additives") may be incorporated into the resilient material from which the device is molded in any convenient fashion. For example, the additives may be physically mixed with the deformable resilient material before it is formed into the prophy cup (an arrangement that is particularly advantageous where natural or synthetic rubbers are employed). Alternatively, where the body is molded from plastic, the additives may be physically mixed with the plastic material before the plastic material is pelletized or plastic pellets and abrasive in suitable quantities may be admixed in a suitable grinder prior to introduction into the molding apparatus. Substantially any method may be employed so long as the material from which the prophy cup is formed contains the desired amount of the additives.

Suitable anticariogenic agents include fluoride and/or stannous ion containing materials. Suitable fluoride agents include one or more water-soluble fluoride salts, especially stannous ion containing fluoride salts, including $SnF_2$, $NaF$, $SnF_4$, $KF$, $InF_3$, $PdF_2$, $FeF_2$, and $LiF$, as well as more complex water-soluble fluoride-containing agents such as fluorosilicates, e.g., $Na_2SiF_6$, fluorozirconates, e.g., $CaZrF_6$, $Na_2ZrF_6$, $K_2ZrF_6$, $SnZrF_6$, $InZrF_7$, fluorostannites, e.g., $NaSnF_3$, $KSnF_3$, $NaSn_2F_5$, fluoroborates, e.g., $NaBF_4$, fluorotitanates, e.g., $NaTiF_5$, and fluorogermanates, e.g., $K_2GeF_6$, $Zr(GeF_6)_2$, $ZrOGeF_6$, $In_2(GeF_6)_3$, and mixed halides, e.g., $SnClF$ and $Sn_2ClF_3$. Non-fluoride tin(II) ion containing salts may be also employed. Suitable salts include tin(II) chloride, $SnCl_2 \cdot 2H_2O$;

tin(II) gluconate, Sn $(C_{12}H_{22}O_{14})_2$; tin(II) sulfate, $SnSO_4$; tin(II) citrate, $Sn(C_6H_5O_7)_2$; and other tin(II) salts of carboxylic acids (e.g., formic acid, acetic acid, propionic acid, and the like). In addition, less soluble tin(II) compounds which contain metabolically active tin(II) (e.g., tin(II) pyrophosphate $Sn_2P_2O_7$, or tin(II) oxide, SnO) may be employed. Mixtures of suitable agents may also be utilized. Sodium fluoride, NaF, and indium fluorozirconate, $InZrF_7$, are preferred anticariogenic agents in accordance with this invention.

While up to about 15 percent by weight of the unitary body of the prophy cup is the general range for the anticariogenic agent (5 percent by weight calculated as fluoride ion), best results are achieved where at least about 1.0—7.0 percent of the agent (0.5—2.5 percent calculated as fluoride ion) is employed.

While up to about 50 percent by weight of the unitary body of the prophy cup is the general range for the abrasive constituent, best results are achieved where at least about 5 percent or 10 percent and up to about 25 percent of the abrasive material is employed. Although up to about 50 percent by weight will yield satisfactory performance from a dental enamel cleaning and polishing standpoint, because of the effect of the abrasive particles on certain resilient materials from which the prophy cup is fabricated, the useful life of such prophy cups may be diminished. Accordingly, an especially preferred range for the abrasive constituents of the cup is in the range of about 10 percent—25 percent by weight.

Suitable dental abrasive materials include zirconium silicate; lava pumice, quartz ($SiO_2$); montmorillonite $[Al,Mg_{,8}(Si_4)_{10(3)}(OH)_{10} \cdot 12H_2O]$; feldspar; aragonite ($CaCO_3$); calcite ($CaCO_3$); kaolinite $[Al_4(Si_4O_{10})_x(OH)_8]$; as well as other dental abrasives such as alumina ($Al_2O_3$); zirconium oxide ($ZrO_2$); and talcs $[Mg_3Si_4O_{10}(OH)_2]$. Zirconium silicate and zirconium silicate-tin dioxide mixtures in accordance with the teachings of applicant's U.S. Pat. Nos. 3,257,282; 3,330,732; and 3,378,445 are useful abrasive systems for purposes of this invention, as are mixtures of the above abrasive materials, although such mixtures should advantageously include at least about 10 percent and preferably at least about 20 percent or 25 percent zirconium silicate.

An especially preferred abrasive system for use in practicing the present invention comprises 3:1 weight mixture of relatively small (i.e., predominantly in the range of up to about 20 microns particle size) zirconium silicate and medium sized (i.e., in the range of about 25—75 microns particle size) aluminum oxide, $Al_2O_3$.

The compositions of exemplary prophy cups in accordance with this invention are given in the following Examples.

EXAMPLE I

| Constituent | Parts by Weight (%) |
|---|---|
| Butadiene—styrene block copolymer | 97.5 |
| Sodium fluoride | 2.5 |

EXAMPLE II

| Constituent | Parts by Weight (%) |
|---|---|
| Butadiene—styrene block copolymer | 85.0 |
| Zirconium silicate/alumina (3:1 weight mixture) | 15.0 |

EXAMPLE III

| Constituent | Parts by Weight (%) |
|---|---|
| Synthetic rubber | 87.5 |
| Zirconium silicate | 10.0 |
| Indium fluorozirconate | 2.5 |

EXAMPLE IV

| Constituent | Parts by Weight (%) |
|---|---|
| Butadiene—styrene block copolymer | 82.5 |
| Zirconium silicate/alumina (3:1 weight mixture) | 15.0 |
| Sodium fluoride | 2.5 |

An additive containing dental prophylaxis cup produced in accordance with the present invention may be employed either alone (with water or another liquid composition) or with an abrasive or a fluoride and abrasive-containing prophylactic paste to accomplish a dental prophylaxis in the following manner.

Each tooth is thoroughly scaled in order to remove all calculus and soft debris. After scaling is completed, the prophylactic mixture is prepared. Using a prophylactic paste and the prophy cup implement of the present invention, the applicator polishes the buccal-labial surfaces of the maxillary right quadrant. Each surface of the tooth is treated for at least 10 seconds. Then the lingual surfaces of the maxillary right quadrant are correspondingly treated. Unwaxed dental floss is used in all interproximals and preferably is utilized with an excess of the prophylactic paste. The patient may be allowed to rinse thoroughly with water any time during the treatment.

After rinsing, the lingual one-half of the maxillary left quadrant is polished and the patient is allowed to rinse. The buccolabial one-half of the maxillary left quadrant is polished, but the patient is not allowed to rinse until all of the interproximal contacts have been cleaned and polished with the unwaxed dental floss. The buccal and lingual surfaces of the mandibular right molars and bicuspids are then polished. Unwaxed dental floss is used in the interproximals before rinsing.

The mandibular anterior teeth are polished next, both labially and lingually, and the interproximal areas are polished with the unwaxed dental floss before rinsing is allowed. The buccal and lingual surfaces of the mandibular left molars and bicuspids are then polished, the interproximals are dental flossed, and the patient is allowed to rinse. The occlusal surfaces and all pits and fissures are then polished with a stiff bristle prophylactic brush and the prophylactic paste. The patient is then allowed to rinse his mouth as thoroughly as possible.

Best results appear to be achieved where the cup is used with a prophylaxis paste or powder containing the same abrasive material that is incorporated in the prophy cup. Experience also suggests that both the cup and the prophylaxis paste contain a fluoride ion containing anticariogenic agent.

A suitable nonabrasive containing liquid composition in accordance with the present invention could contain various chemical constituents (such as sodium bicarbonate, $NaHCO_3$, or the like) in order to chemically aid in the removal of dental plaque, pellicle, calculus, and stains. Likewise, such a composition could advantageously contain fluoride and stannous ion containing anticariogenic agents.

Through the use of fluoride ion containing prophy cups of this invention, increased uptake of fluoride into the enamel crystal lattice (i.e., permanent incorporation of fluoride into the apatite crystals) is found to occur when such a cup is employed in a conventional prophylaxis, both in the presence and in the absence of a fluoridated prophylaxis paste. It is believed that this phenomenon occurs because of the thermodynamic aspect of the substitution of the fluoride for hydroxyl ions of the apatite crystals. It has been found that energy must be supplied in order for a permanent substitution to occur, and the heat produced by the action of a rapidly rotating prophy cup, preferably one containing an abrasive, on the enamel crystals supplies this energy in the form of friction produced heat, thereby encouraging permanent fluoride uptake.

EXPERIMENTAL EVALUATIONS

The superiority of the abrasive-containing dental prophylaxis cups of the present invention has been substantiated by the following experimental evaluations. A definite laboratory polishing test has been developed to evaluate a number of dental cleaning and polishing agents and implements. In accordance with this method, the lingual surfaces of freshly extracted maxillary anterior teeth are reduced with the aid of a diamond disc, and the teeth are mounted by means of a low melting alloy, such as Wood's metal, on hexagonal jigs constructed so as to fit the movable state of a reflectometer. The exposed labial surface of each tooth is mounted in such a manner that the height of the contour is a suitable distance above the base of the jig. Throughout the procedure, care is taken to ensure that the teeth do not become dry in order to prevent damage of the tooth tissues. The exposed enamel surface is then dulled by exposing it to 0.10 percent hydrochloric acid (pH 2.2) for 30 seconds. Any acid remaining on the tooth surface is neutralized by immediately transferring the tooth to a saturated sodium carbonate solution for 30 seconds. The tooth is then rinsed with water and blotted dry.

The maximum reflectance of the dulled tooth surface is determined by means of a reflectometer especially adapted to detect the changes in the degree of polish of the enamel surface. The reflectometer is constructed so that the enamel is exposed to a beam of polarized light, and the amount of light reflected from the enamel surface is determined by a photoelectric cell which in turn activates a galvanometer. The smoother the enamel surface, the smaller the amount of diffused and absorbed light and, hence, the higher the galvanometer reading.

After the maximum reflectance of the dulled tooth is determined, the tooth to be evaluated is mounted on a dental handpiece and is polished using the prophy implement. After the tooth has been polished, the enamel surface is rinsed with water to remove any residue and the reflectance of the enamel surface is again measured with the tooth located in exactly the same position as that used to obtain the "dull" reading. The absolute change in the amount of reflectance between the dulled and polished enamel surfaces is taken as a measure of the degree of polishing imparted by the prophylaxis treatment, a greater change indicating a greater polishing ability.

A definitive laboratory cleaning test has been used to measure cleaning ability. This test, as described in Cooley et al. U.S. Pat. No. 3,151,027, involves the use of polyester plastic blocks which are ground smooth, washed, dried, and a thin coating of black lacquer is carefully applied to the surface of the block. The blocks are then treated with the prophy cup to be evaluated for a given period of time. The blocks are weighed before and after the treatment, with the cleaning values for the materials being given in milligrams weight loss, a greater weight loss indicating a greater cleaning ability.

Abrasive containing prophy cups have been evaluated in accordance with the foregoing procedures in the presence of two different prophylaxis agents, namely, zirconium silicate (as described in applicant's U.S. Pat. No. 3,330,732) and lava pumice. For control purposes, similar tests were conducted with a conventional, nonabrasive containing natural rubber prophy cup. The cleaning and polishing data, which are given in Table I, substantiate the remarkable effectiveness of prophy cups produced in accordance with the present invention.

TABLE I

| Cup and Abrasive | Enamel polish | | Enamel cleaning | |
|---|---|---|---|---|
| | With ZrSiO₄ prophy paste | Percent improvement relative control | With pumice prophy paste | Percent improvement |
| Conventional rubber cup | 3.00 | | 3.00 | |
| Butadiene-styrene block copolymer with 10% ZrSiO₄/Al₂O₃ (3:1 weight mixture) | 4.79 | 58 | 18.47 | 520 |
| Butadiene-styrene block copolymer with 15% ZrSiO₄/Al₂O₃ (3:1 weight mixture) | 5.36 | 79 | 21.98 | 640 |

More particularly, the data indicate improvements in cleaning of an extremely high order of magnitude. Furthermore, it is important to note that such dramatic improvements in cleaning are achieved without sacrifice in polishing effectiveness. Indeed, substantial improvements of polishing effectiveness are obtained at the same time.

Further studies have been undertaken to evaluate the effectiveness of a prophylaxis cup as a vehicle for administering fluoride ion containing anticariogenic agents. In order to determine if fluoride incorporated into a dental prophylactic cup was taken-up by the enamel surface, a series of synthetic resin prophylactic cups were prepared containing 2.5 percent fluoride provided as a variety of different fluoride compounds. Specially prepared bovine enamel sections were cleaned with flour of pumice and then given a 60-second prophylaxis using the respective prophylactic cups and redistilled water. The prophylaxes were performed with the aid of a portable dental engine, a conventional handpiece and prophy angle, with a speed of 800—100 r.p.m. Following the treatment procedure the enamel sections were rinsed, blotted dry, and a layer of enamel removed by immersion in 2.0 N perchloric acid for 30 seconds. The decalcification solution was subsequently analyzed for calcium by atomic absorption spectroscopy and for fluoride using the fluoride electrode (Orion). The results are reported in Table II.

These data indicate that, while the use of all four fluoride compounds resulted in a numerical increase in the fluoride content of the enamel following a 60-second prophylaxis, the greatest fluoride increase occurred following the use of prophylactic cups containing NaF or InZrF$_7$.

TABLE II

| Source of added fluoride in cup | Fluoride concentration (percent F) | Prophy paste | Length of prophy (sec.) | Fluoride uptake in enamel (μg. F/μg. Ca×10⁻³) | Percent increase in enamel fluoride content |
|---|---|---|---|---|---|
| None | 0.0 | H₂O | 60 | ¹ 0.294±0.083 | |
| SnF₂ | 2.5 | H₂O | 60 | 0.478±0.151 | 39 |
| NaF | 2.5 | H₂O | 60 | 1.260±0.647 | 329 |
| SnZrF₆ | 2.5 | H₂O | 60 | 0.677±0.214 | 130 |
| InZrF₇ | 2.5 | H₂O | 60 | 1.135±0.319 | 286 |

¹ Standard error of the mean.

A further study was conducted in order to determine the comparative enamel fluoride uptake derived from the use of a conventional rubber prophylactic cup and an impregnated synthetic resin cup with two different fluoride-containing prophylactic pastes. Additionally, the stability of the fluoride in the enamel surface was determined. Bovine enamel sections were given a 60-second prophylaxis using the respective prophylactic cup and paste using the technic described above; and the immediate uptake of fluoride in enamel was determined as described above. In addition, the stability of the fluoride in the enamel was determined by immersing the treated bovine enamel specimens in artificial saliva in a constant immersion apparatus revolving at 3 r.p.m. for 72 hours. At the conclusion of the immersion period the teeth were rinsed, blotted dry, and an enamel layer similarly removed and again analyzed for calcium and fluoride.

Table III summarizes the findings obtained when comparing a NaF-impregnated and a conventional rubber cup with regard to fluoride uptake in enamel when used with two different prophylactic pastes. The use of a conventional rubber cup with a SnF₂–ZrSiO₄ prophylactic paste resulted in an enamel fluoride uptake of 1.209 while the use of the NaF-impregnated prophylactic cup with this same paste resulted in a significantly greater (P<0.05) enamel fluoride uptake value of 2.281. A similar trend was observed when these prophylactic cups were used with a NaF-pumice prophylactic paste with enamel fluoride uptake values of 1.468 and 2.035 observed with the use of the rubber and impregnated prophylactic cups, respectively.

The data concerning the stability of the fluoride taken-up by enamel are also shown in Table III. After an immersion period of 72 hours in artificial saliva, the use of the impregnated prophylactic cup in combination with the NaF-pumice prophylactic paste resulted in the greatest amount of fluoride in enamel. This latter value of 2.593 is significantly greater ($P<0.05$) than that found 72 hours after the use of a rubber cup with the $SnF_2$-$ZrSiO_4$ prophylactic paste.

In sum, the impregnation of a fluoride compound into a prophylactic cup results in an increased enamel fluoride content following a prophylaxis with water. Moreover, the use of an impregnated prophylactic cup with different fluoride-containing prophylactic pastes resulted in greater enamel fluoride than was found when a conventional rubber prophylactic cup was employed with these same pastes, and, after immersion of treated enamel in artificial saliva for 72 hours, the use of the impregnated prophylactic cup resulted in significantly greater residual fluoride than was found with the use of a conventional rubber cup with a $SnF_2$-$ZrSiO_4$ prophylactic paste.

TABLE III

| Prophy cup | | | Prophy paste | | Fluoride uptake in enamel ($\mu g. F/\mu g. Ca \times 10^{-3}$) following treatment | Fluoride uptake in enamel ($\mu g. F/\mu g. Ca \times 10^{-3}$) after 72 hours |
|---|---|---|---|---|---|---|
| Type | Source of fluoride | Fluoride conc. (percent F) | Abrasive | Source of fluoride | | |
| Rubber | None | 0.0 | $ZrSiO_4+SnO_2$ | None | [1] 0.578±0.208 | |
| Do | do | 0.0 | $ZrSiO_4+SnO_2$ | $SnF_2$ | 1.209±0.308 | [1] 1.382±0.326 |
| Impregnated | NaF | 2.5 | $ZrSiO_4+$ | $SnF_2$ | 2.281±0.320 | 1.431±0.167 |
| Rubber | None | 0.0 | Pumice | NaF | 1.468±0.455 | 2.172±0.386 |
| Impregnated | NaF | 2.5 | do | NaF | 2.035±0.485 | 2.593±0.453 |

[1] Standard error of the mean.

From the foregoing, it can be seen that the fluoride and/or abrasive-containing prophylaxis implements of the present invention represent a substantial advance in the dental health arts. The use of such a device permits one to perform a dental prophylaxis treatment so as to remove and inhibit the reformation of plaque, pellicle, and calculus. The implement both cleans and polishes in its own right and likewise enhances the cleaning and polishing activities of abrasive-containing prophylaxis mixtures, especially where the abrasive in the prophy cup is also present in the prophylaxis paste or powder. Furthermore, the use of a fluoride containing implement permits the achievement of increased permanent uptake of fluoride into the tooth structure, thereby rendering it more resistant to the formation of dental caries.

I claim:

1. A dental prophylaxis implement adapted for removable mounting on a dental handpiece and comprising:
    a unitary body formed of resilient material,
    the said body having at least one applicator portion capable of performing a dental prophylaxis, and
    the resilient material from which the unitary body is formed having incorporated therein up to about 15 percent by weight of an anticariogenic agent; and
    means in association with the unitary body for removably mounting the unitary body on the dental handpiece.

2. An implement, as claimed in claim 1, wherein the anticariogenic agent comprises a source of fluoride ions and is incorporated at a level of about 1—15 percent by weight.

3. An implement, as claimed in claim 1, wherein the anticariogenic agent is sodium fluoride, NaF.

4. An implement, as claimed in claim 1, wherein the anticariogenic agent is indium fluorozirconate, $InZrF_7$.

5. An implement, as claimed in claim 1, wherein the resilient material has further incorporated therein up to about 50 percent by weight of a dental cleaning and polishing agent.

6. An implement, as claimed in claim 5, wherein the dental cleaning and polishing agent is incorporated at a level of about 10—25 percent by weight.

7. An implement, as claimed in claim 5, wherein the dental cleaning and polishing agent comprises zirconium silicate, $ZrSiO_4$.

8. An implement, as claimed in claim 5, wherein the dental cleaning and polishing agent comprises a mixture of zirconium silicate and aluminum oxide.

9. An implement, as claimed in claim 5, wherein the resilient material is a butadiene-styrene block copolymer.

10. An implement, as claimed in claim 5, wherein the resilient material is a member selected from the group consisting of natural and synthetic rubbers.

11. A dental prophylaxis implement adapted for removable mounting on a dental handpiece and comprising:
    a unitary body formed of resilient material,
    the said body having at least one applicator portion capable of performing a dental prophylaxis, and
    the resilient material from which the unitary body is formed having incorporated therein up to about 50 percent by weight of a dental cleaning and polishing agent comprising zirconium silicate, $ZrSiO_4$; and
    means for removably mounting the unitary body on the dental handpiece.

12. An implement, as claimed in claim 11, wherein the dental cleaning and polishing agent is incorporated at a level of about 10—25 percent by weight.

13. An implement, as claimed in claim 11, wherein the resilient material is a member selected from the group consisting of natural and synthetic rubbers.

14. A dental prophylaxis implement adapted for removable mounting on a dental handpiece and comprising:
    a unitary body formed of resilient material,
    the said body having at least one applicator portion capable of performing a dental prophylaxis, and
    the resilient material from which the unitary body is formed having incorporated therein up to about 50 percent by weight of a dental cleaning and polishing agent comprising a mixture of zirconium silicate, $ZrSiO_4$, and aluminum oxide, $Al_2O_3$; and
    means for removably mounting the unitary body on the dental handpiece.

15. A dental prophylaxis implement adapted for removable mounting on a dental handpiece and comprising:
    a unitary body formed of butadiene-styrene block copolymer,
    the said body having at least one applicator portion capable of performing a dental prophylaxis, and
    the butadiene-styrene block copolymer from which the unitary body is formed having incorporated therein up to about 50 percent by weight of a dental cleaning and polishing agent; and
    means for removably mounting the unitary body on the dental handpiece.